(12) United States Patent
Chen

(10) Patent No.: US 7,062,585 B2
(45) Date of Patent: Jun. 13, 2006

(54) MEMORY CARD FOR INTEGRATING THE USB INTERFACE AND AN ADAPTOR FOR THE MEMORY CARD

(75) Inventor: Chih-Ju Chen, Hsinchu (TW)

(73) Assignee: Altek Corporation, Hsinchu (TW)

( * ) Notice: Subject to any disclaimer, the term of this patent is extended or adjusted under 35 U.S.C. 154(b) by 242 days.

(21) Appl. No.: 10/644,804

(22) Filed: Aug. 21, 2003

(65) Prior Publication Data

US 2005/0060466 A1    Mar. 17, 2005

(51) Int. Cl.
*G06F 12/00* (2006.01)
*G06F 13/20* (2006.01)
*H01R 25/00* (2006.01)
*H05K 7/00* (2006.01)

(52) U.S. Cl. .................. 710/301; 711/103; 439/639

(58) Field of Classification Search ........ 710/300–303, 710/62, 74, 313, 316; 711/100, 103; 361/684, 361/686, 737; 439/59, 79, 945, 638, 639
See application file for complete search history.

(56) References Cited

U.S. PATENT DOCUMENTS 6,131,135 A * 10/2000 Abramson et al. .......... 710/113
6,246,578 B1 * 6/2001 Wei et al. ................... 361/686
6,438,638 B1 * 8/2002 Jones et al. ................. 710/301
6,725,286 B1 * 4/2004 Takahashi ...................... 710/8
6,854,984 B1 * 2/2005 Lee et al. ..................... 439/79

OTHER PUBLICATIONS

"The performance improvement of a photo card reader by the use of a high-integration chip solution with double FIFO buffers" by Ying-Wen Bai and Chang-Chih Liu (abstract only) Publication Date: May 2005.*

* cited by examiner

*Primary Examiner*—Gopal C. Ray
(74) *Attorney, Agent, or Firm*—Rosenberg, Klein & Lee

(57) ABSTRACT

A memory card integrating functions of the USB interface includes a memory chip inside a main body. A SD or MS control interface, a USB control interface, a controller, and a storage memory are built in the memory chip. Conductive bars are electrically connected to the memory chip and stick out from one end of the main body. An adaptor for the memory card includes an insertion socket to receive a SD memory card or a MS memory card. Conductive pins are positioned inside the insertion socket to be electrically connected to the memory card. A USB connecting head is provided at the front end of the insertion socket and electrically connected to the conductive pins inside the insertion socket. The SD memory card and the MS memory card can be inserted into the USB slot through the adaptor.

14 Claims, 5 Drawing Sheets

MEMORY CARD FOR INTEGRATING THE USB INTERFACE AND AN ADAPTOR FOR THE MEMORY CARD

BACKGROUND OF THE INVENTION

1. Field of the Invention

The invention relates to a memory card and, more particularly, to a SD memory card and a MS memory card that can be inserted into a USB slot through an adaptor for integrating the functions of USB interface.

2. Description of the Related Art

An Electrically Erasable Programmable Read Only Memory (EEPROM) is a memory device that has been widely used in information electronic products. However, a conventional EEPROM has a drawback; that is, its accessing speed is too slow. In recent years, a better EEPROM with faster accessing speed has been developed with advanced technique, which is called flash memory.

As a non-volatile memory, a flash memory has functions of electric writing and erasing data. Therefore, a flash memory can be broadly used in electronic products such as notebook computers and digital cameras that have been miniaturized for better portability. In fact, the developing trend of electronic products is to pursue slimmer and smaller products. Therefore, the size of flash memory has to be reduced to catch up with the trend. For this reason, a Secured Digital (SD) memory card, which has small volume, fast accessing ability, and good applicability to digital cameras, has potential to dominate the small-sized memory card market. Unfortunately, in the current market, not many computers have a slot available for the SD memory card. On the other hand, the penetration rate of a USB slot is relatively high compared to the slot for the SD memory card. Also, a portable hard disk with USB flash memory is pretty convenient for use because it can carry information around. Nevertheless, the USB flash memory is still facing a problem that it cannot adapt to a SD slot.

Focusing on the above-mentioned problem, the invention provides a SD memory card for integrating the functions of USB interface in order that the SD memory card can be inserted into the USB slot through an adaptor. In addition, since the SD memory card is similar to a Memory Stick (MS) card, the invention also provides a MS card for integrating the USB interface.

SUMMARY OF THE INVENTION

The main and first object of the invention is to provide a SD memory card for integrating the USB interface, and by building in a SD control interface and a USB control interface on the control chip of the SD memory card, the application scope of the SD memory card can be expanded.

The second object of the invention is to provide an adaptor for a SD memory card, and as soon as the SD memory card is connected to the adaptor, the SD memory card can be inserted into the USB slot for use through the adaptor.

The third object of the invention is to provide a MS memory card for integrating the USB interface, and by building in a MS control interface and a USB control interface on the control chip of the MS memory card, the application scope of the MS memory card can be expanded.

The fourth object of the invention is to provide an adaptor for a MS memory card, and as soon as the MS memory card is connected to the adaptor, the MS memory card can be inserted into the USB slot for use through the adaptor.

According to the first aspect of the invention, a SD memory card for integrating the USB interface includes a main body, in which a memory chip is provided therein, and a SD control interface, a USB control interface, a controller, and a storage memory are built in the memory chip; and a plurality of conductive bars for connecting the memory chip, wherein the conductive bars stick out from one side of the main body. Besides, the SD control interface can alternatively be a MS control interface, and if so, the memory card would be a MS memory card for integrating the USB interface.

According to the second aspect of the invention, an adaptor for a memory card includes an insertion socket to be inserted in a SD memory card or a MS memory card, wherein a plurality of conductive pins are provided inside the insertion socket and electrically connected to the memory card; and a USB connecting head provided at the front end of the insertion socket and electrically connected to the conductive pins inside the insertion socket.

The objects and technical contents of the invention will be better understood through the description of the following embodiments with reference to the drawings.

DETAILED DESCRIPTION OF THE PREFERRED EMBODIMENTS

Figure 1:
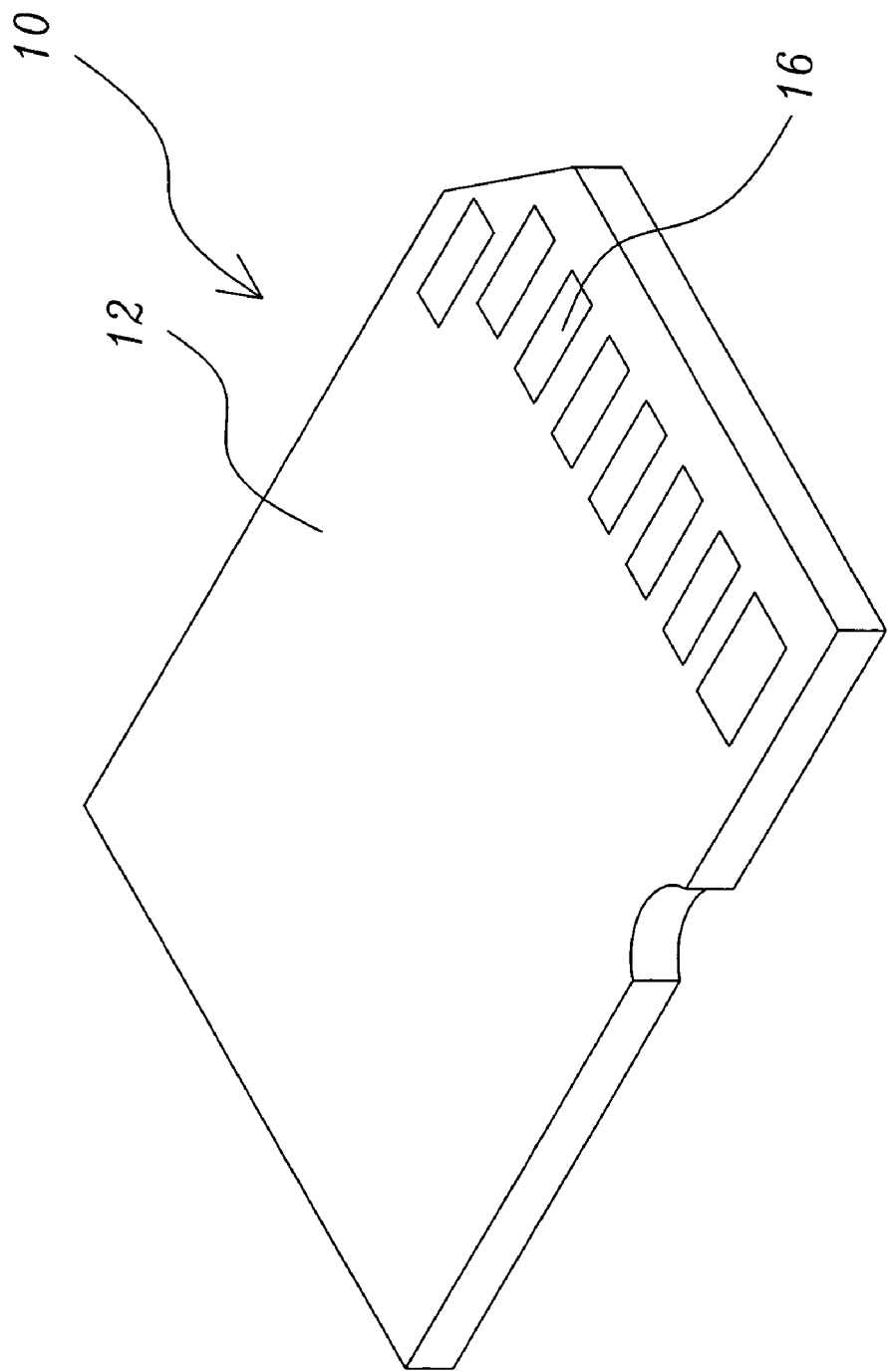
FIG. 1 is a schematic diagram showing a perspective structure of the memory card for integrating USB interface of the invention.
Figure 2:
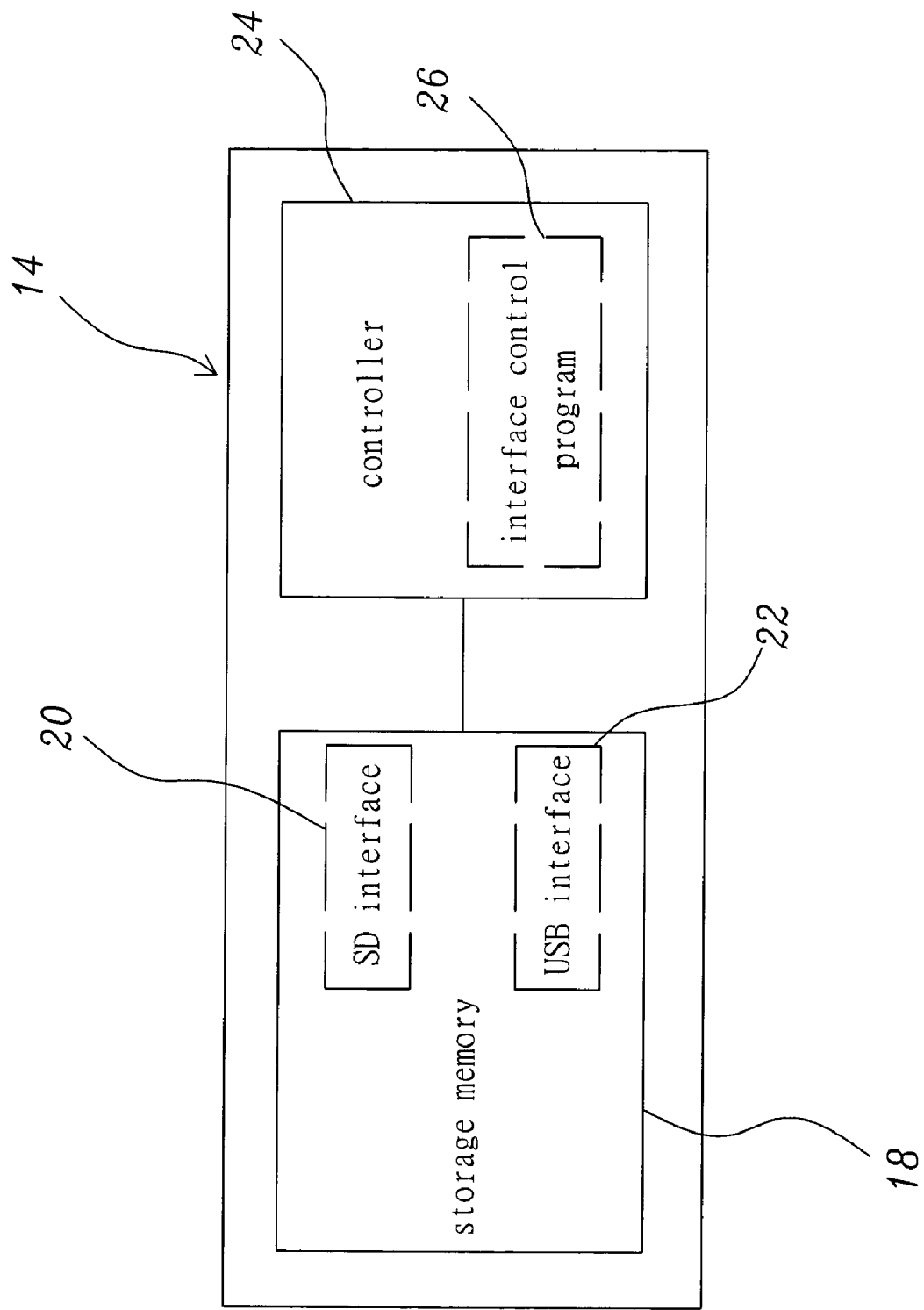
FIG. 2 is a block diagram showing the structure of the SD memory chip of the invention.

The structure of the SD memory card 10 for integrating USB interface of the invention is shown in FIG. 1. The invention includes a main body 12, in which a SD memory chip 14 is provided therein. Besides, a plurality of conductive bars 16 is connected to the SD memory chip 14 and sticks out from one end of the main body 12. Next, the structure of the SD memory chip 14 is shown in FIG. 2. The SD memory chip 14 is provided with a storage memory 18, which is usually a flash memory or an EEPROM. In addition, a SD control interface 20 and a USB control interface 22 are built in the storage memory 18, and a controller 24 is connected to the storage memory 18. Besides, an interface control program 26 is built in the controller 24, and through the interface control program 26, the controller 24 can select executing either the SD control interface 20 or the USB control interface 22.

Similarly, the structure of a MS memory card for integrating USB interface of the invention is the same as that of FIG. 1. Besides, the structure of the MS memory chip is the same as that of FIG. 2 except for one difference. The difference is that the SD control interface 20 in the SD memory chip will be replaced by a MS control interface.

Figure 3:
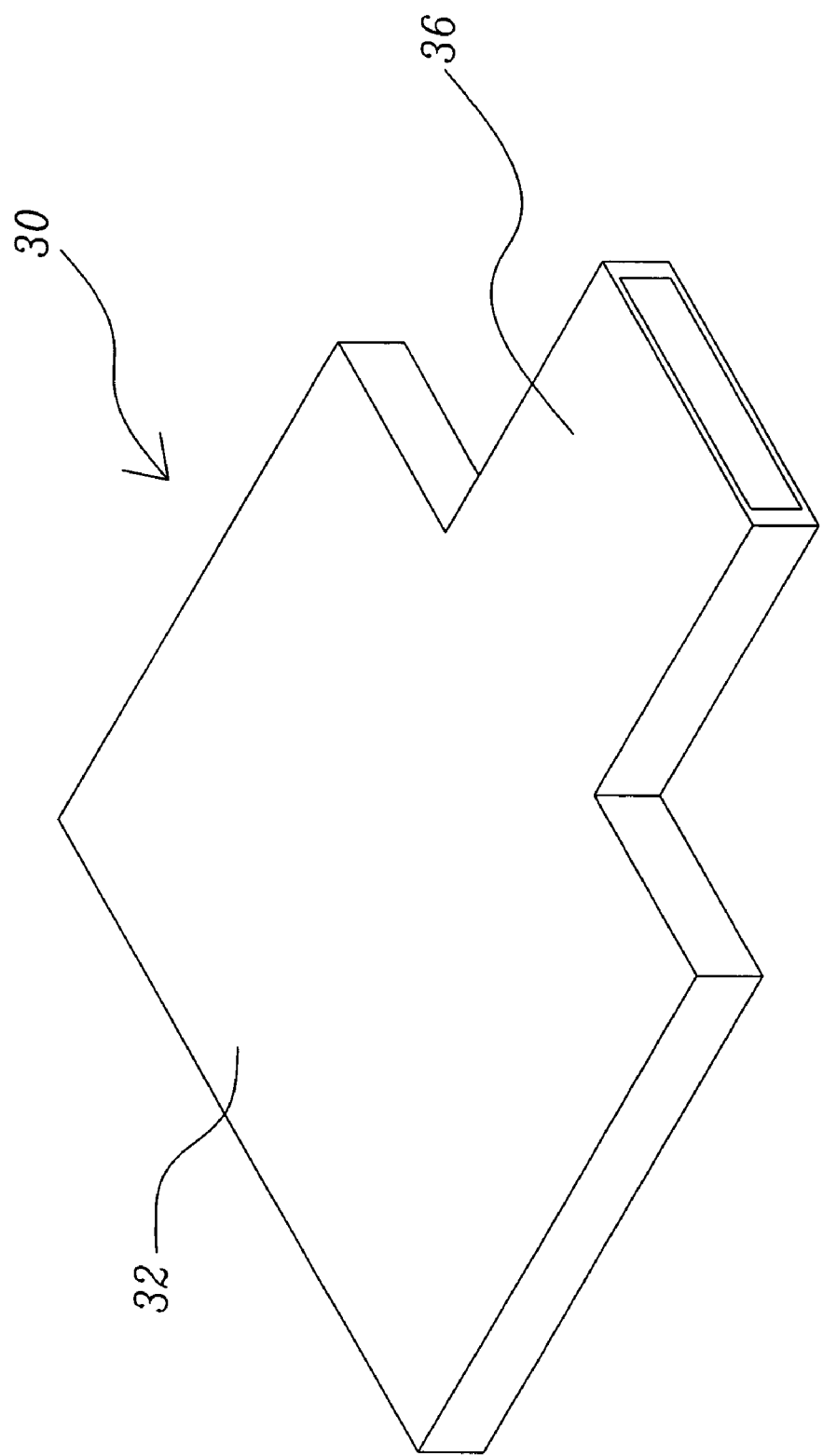
FIG. 3 is a schematic diagram showing a perspective view of the adaptor of the invention.
Figure 4:
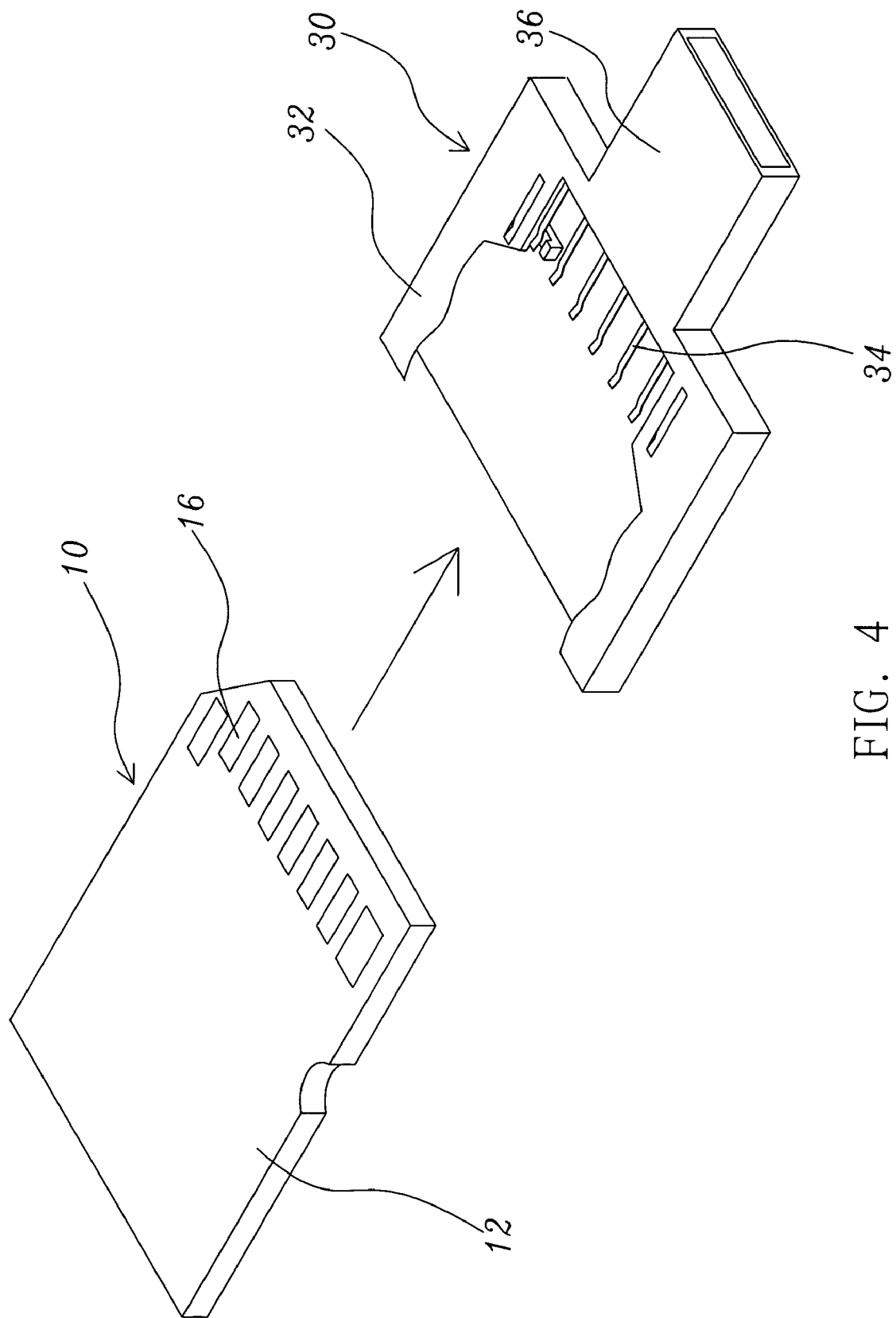
FIG. 4 contains two parts: one is a partially sectional view of the adaptor of the invention, and the other is a schematic view showing the adaptor is joined to the memory card.

Moreover, the structure of the adaptor of the invention is shown in FIG. 3, whereas a partially sectional view of the adaptor is shown in FIG. 4. Since the structure of the adaptor of the SD memory card 10 is the same as that of the MS memory card, the SD memory card 10 will be used as an example hereinafter for illustrating the adaptor. The adaptor 30 of the SD memory card 10 includes an insertion socket 32 to be inserted in by the SD memory card 10. Besides, a plurality of conductive pins 34 are provided inside the insertion socket 32 corresponding to the conductive bars 16 on the surface of the SD memory card 10 for forming an electrical connection between the insertion socket 32 and the SD memory card. In addition, a USB connecting head 36 is provided at the front end of the insertion socket 32, and an electrical connection is formed between the conductive pins 34 inside the insertion socket 32 and the USB connecting head 36 through the connecting lines.

When the SD memory card 10 is not inserted in the adaptor 30, the controller 24 inside the SD memory chip 14 will automatically select executing the SD control interface 20 through the interface control program 26. Then, when the SD memory card 10 is inserted into a SD card reader, a standard SD memory card can be ready for operation.

Figure 5:
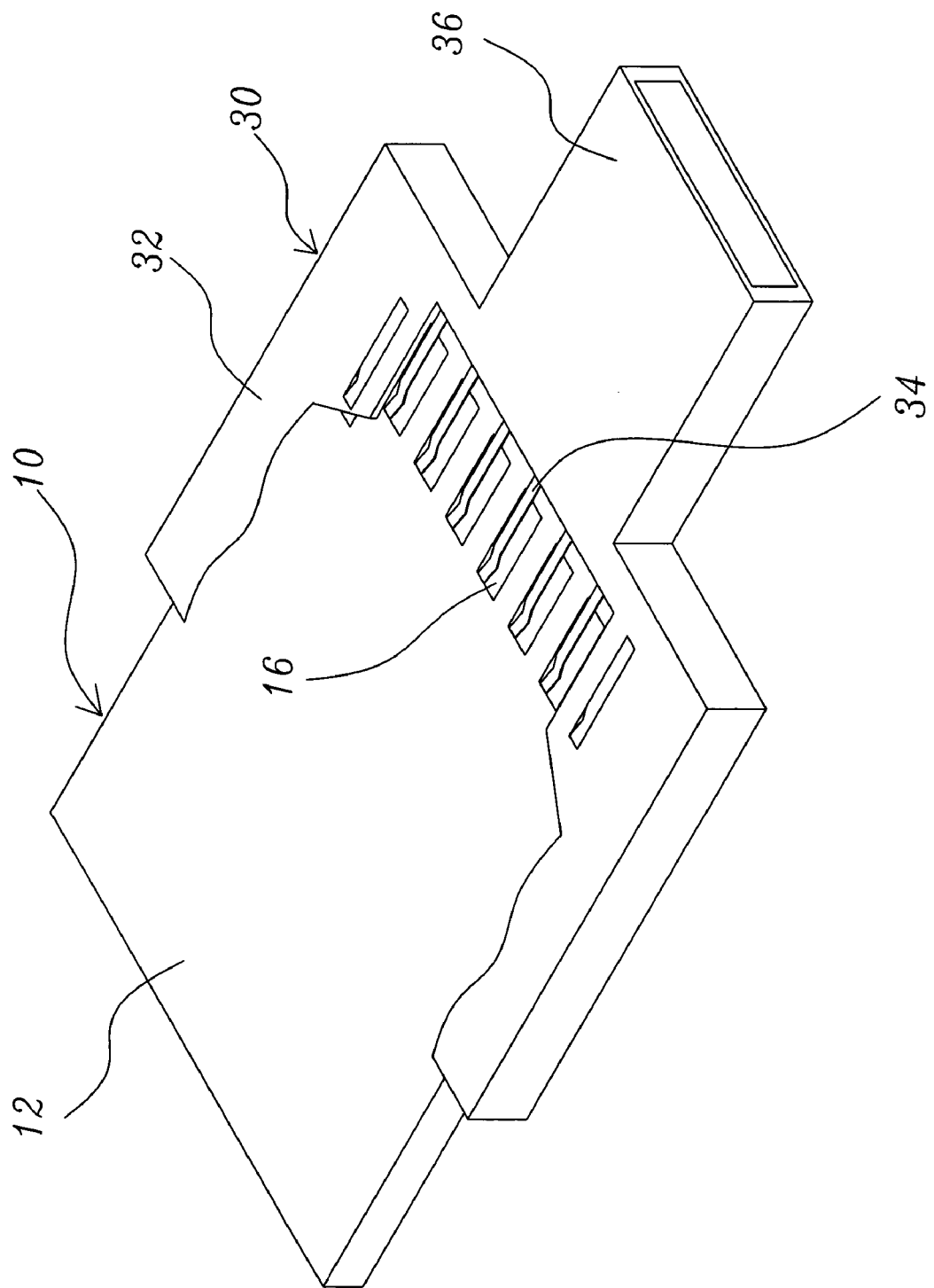
FIG. 5 is a schematic diagram showing the memory card and the adaptor of the invention are joined together.

Moreover, when the SD memory card 10 is to be inserted into a USB slot for use, as shown in FIG. 4, the conductive bars 16 of the SD memory card 10 will have to be inserted into the insertion socket 32 of the adaptor 30, as shown in FIG. 5. By doing so, the conductive bars 16 on the surface of the SD memory card 10 will contact the corresponding conductive pins 34 inside the insertion socket 32 and form an electrical connection. Then, the USB connecting head 36 of the adaptor 30 will be inserted into the USB slot so that conduction between the USB slot and the conductive bars 16 of the memory chip 14 can be formed by means of the conducting lines inside the USB connecting head and the conductive pins 34 inside the insertion socket 32. After that, the controller 24 inside the SD memory chip 14 will activate the USB control interface through the interface control program 26 in order that the SD memory card 10 can be connected to the USB slot for a smooth operation.

By the same token, the operation method of the MS memory card is the same as that is described above for the SD memory card, including the situation that the MS memory card may either be inserted into the adaptor 30 for use in a USB slot or not to be inserted. The only difference between the two memory cards is that the SD control interface 20 will be changed into the MS control interface. Therefore, the operation of the MS memory card will not be reiterated here.

In conclusion, the memory card of the invention normally is a standard SD or MS memory card, but when it is inserted into the adaptor of the invention, the memory chip inside the memory card will activate the USB control interface and ready to be inserted into the USB slot for use. Thus, the invention utilizes an adaptor and a SD memory card (or a MS memory card) with a built-in SD control interface (or a MS control interface) and a USB control interface so that the SD memory card (or the MS memory card) either can be inserted into the SD card reader (or the MS card reader) for use or can employ the adaptor of the invention to expand the application scope of the SD memory card (or the MS memory card). Hence, the SD or MS memory card can be inserted into the computer available with a USB slot for more common and convenient use.

What is claimed is:

1. A memory card integrating functions of the USB interface, including:

a main body;

a memory chip, provided inside the main body, wherein a SD control interface, a USB control interface, a controller, and a storage memory are built in the memory chip, and wherein said controller embedded in said memory chip selects a respective one of said SD control interface and USB control interface for actuation, thereby controlling the coupling of said memory card to a USB connector; and a plurality of conductive bars connected to the memory chip and extending from one end of the main body.

2. The memory card integrating functions of the USB interface as claimed in claim 1, wherein an interface control program is built in the controller.

3. The memory card integrating functions of the USB interface as claimed in claim 2, wherein the controller applies the interface control program to select said respective one of the SD control interface and the USB control interface for execution.

4. The memory card integrating functions of the USB interface as claimed in claim 1, wherein the storage memory is a memory selected from a group consisting of a flash memory and an Electrically Erasable Programmable Read Only Memory (EEPROM).

5. The memory card integrating functions of the USB interface as claimed in claim 1, wherein the SD control interface and the USB control interface are built in the storage memory of the memory chip.

6. A memory card integrating functions of the USB interface, including:

a main body;

a memory chip, provided inside the main body, wherein a MS control interface, a USB control interface, a controller, and a storage memory are built in the memory chip, and wherein said controller embedded in said memory chip selects a respective one of said MS control interface and USB control interface for actuation, thereby controlling the coupling of said memory card to a USB connector; and a plurality of conductive bars connected to the memory chip and extending from one end of the main body.

7. The memory card integrating functions of the USB interface as claimed in claim 6, wherein an interface control program is built in the controller.

8. The memory card integrating functions of the USB interface as claimed in claim 7, wherein the controller applies the interface control program to select said respective one of the MS control interface and the USB control interface for execution.

9. The memory card integrating functions of the USB interface as claimed in claim 6, wherein the storage memory is a memory selected from a group consisting of a flash memory and an Electrically Erasable Programmable Read Only Memory (EEPROM).

10. The memory card integrating functions of the USB interface as claimed in claim 6, wherein the MS control interface and the USB control interface are built in the storage memory of the memory chip.

11. A memory card integrating functions of the USB interface, including:

a main body;

a memory chip, provided inside the main body, wherein a memory card control interface, a USB control interface, a controller, and a storage memory are built in the memory chip, and wherein said controller embedded in said memory chip selects a respective one of said memory card control interface sand USB control interface for actuation, thereby controlling the coupling of said memory card to a USB connector; and a plurality of conductive bars connected to the memory chip and extending from one end of the main body.

12. The memory card integrating functions of the USB interface as claimed in claim 11, wherein the memory card control interface is selected from a group consisting of the SD control interface and the MS control interface.

13. The memory card integrating functions of the USB interface as claimed in claim 11, wherein an interface control program is built in the controller to select said respective one of the memory card control interface and the USB control interface for execution.

14. The memory card integrating functions of the USB interface as claimed in claim 11, wherein the memory card control interface and the USB control interface are built in the storage memory of the memory chip.

* * * * *